Figure 1:
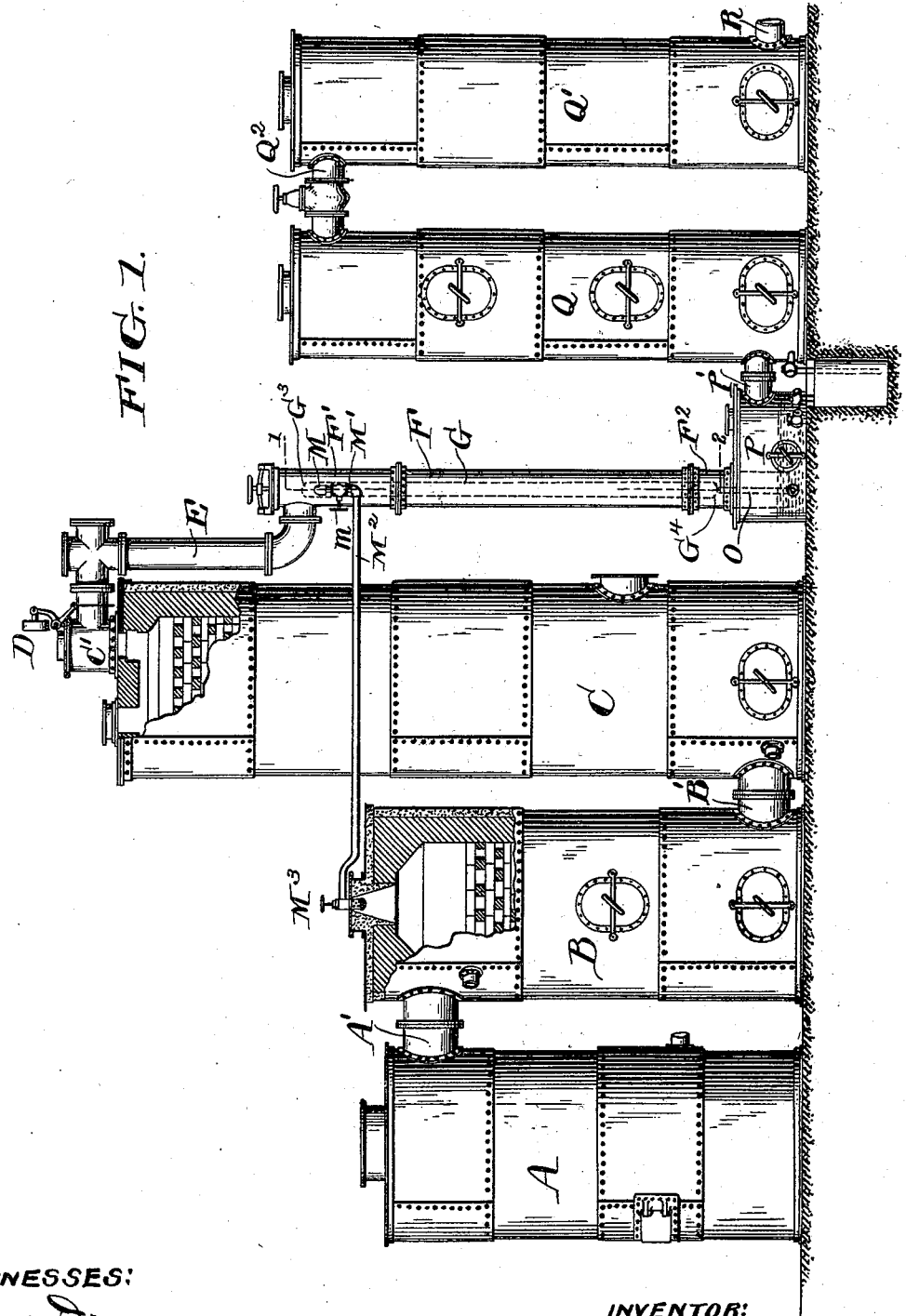

(No Model.) 2 Sheets—Sheet 2.
A. G. GLASGOW.
OIL HEATER.
No. 504,524. Patented Sept. 5, 1893.
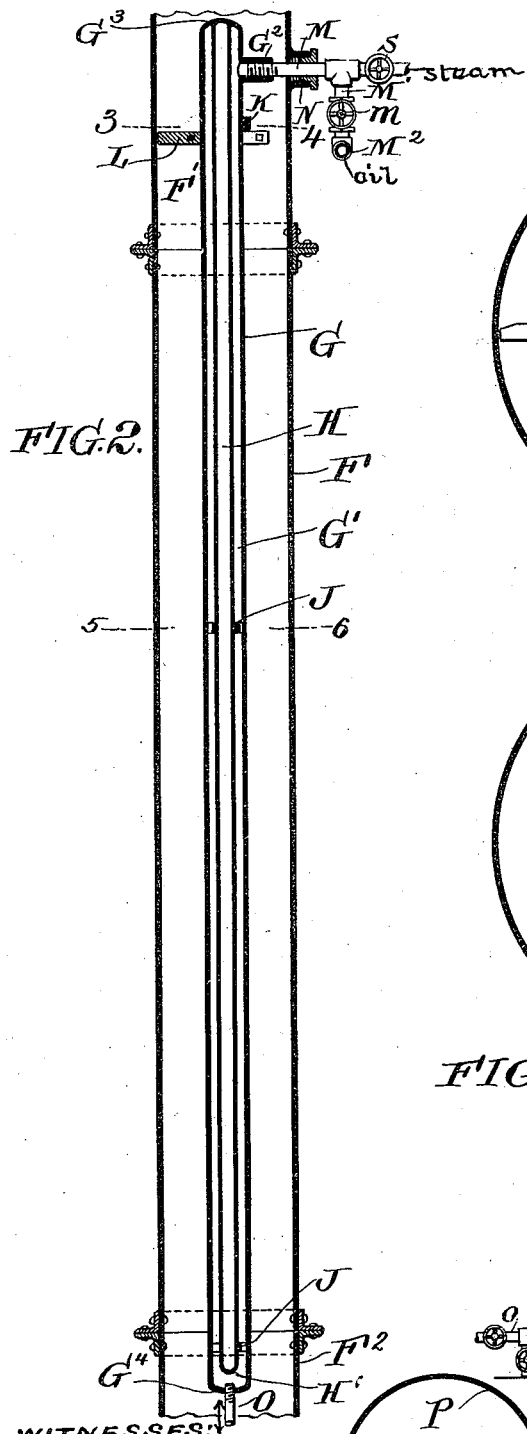
FIG. 2.
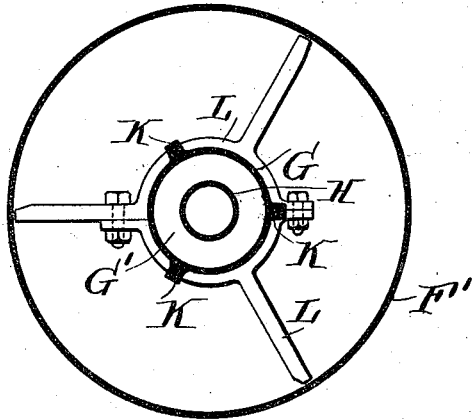
FIG. 3.
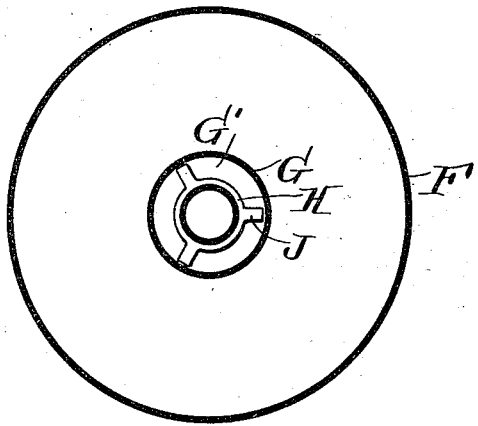
FIG. 4.
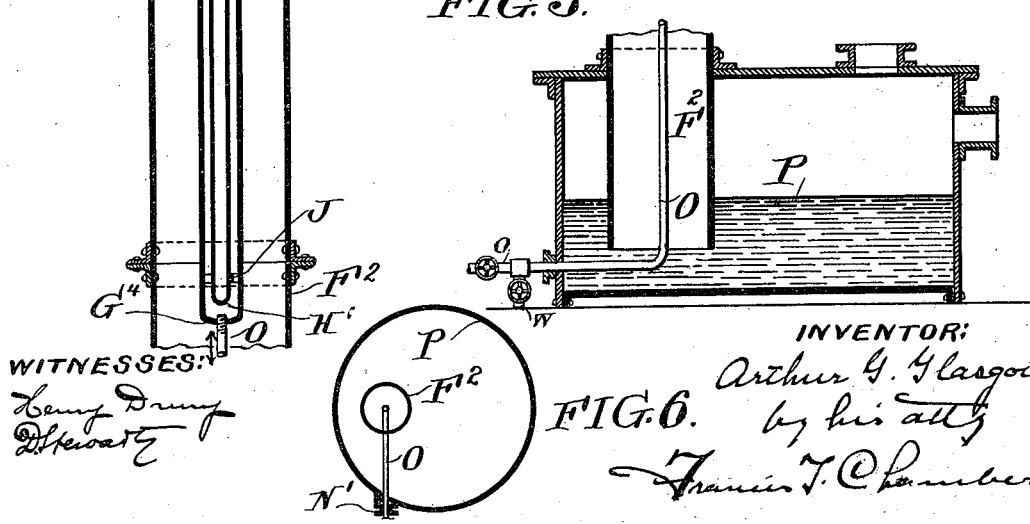
FIG. 5.
FIG. 6.
WITNESSES:
INVENTOR:
Arthur G. Glasgow
by his atty
Francis T. Chambers

UNITED STATES PATENT OFFICE.

ARTHUR GRAHAM GLASGOW, OF PHILADELPHIA, PENNSYLVANIA.

OIL-HEATER.

SPECIFICATION forming part of Letters Patent No. 504,524, dated September 5, 1893.

Application filed December 6, 1892. Serial No. 454,221. (No model.)

*To all whom it may concern:*

Be it known that I, ARTHUR GRAHAM GLASGOW, a citizen of the United States, residing at the city and county of Philadelphia, State of Pennsylvania, have invented a certain new and useful Improved Oil-Heater, of which the following is a true and exact description, reference being had to the accompanying drawings, which form a part of this specification.

My invention relates to apparatus for the manufacture of water gas, and particularly to the construction of the device known as the oil heater used in the carburization of the gas.

The object of my invention is to provide an oil heating device, at once, simple, efficient and durable.

The nature of my improvements will be best understood as described in connection with the drawings in which they are illustrated, and in which—

Figure 1, is a side elevation, partly in section showing a gas manufacturing plant provided with my improvement. Fig. 2, is a longitudinal section on the line 1—2 of Fig. 1, showing the construction of the oil heater. Fig. 3, is a cross section taken on the line 3—4 of Fig. 2. Fig. 4, is a cross section taken on the line 5—6 of Fig. 2; Fig. 5, a central cross section through the wash box, and Fig. 6, an outline plan view of the wash box.

The gas manufacturing plant to which my invention is applied may be of any convenient construction.

As shown in Fig. 1, A is a water gas generator of usual construction; B and C, super-heaters or fixing chambers, the gas passing from the generator through conduit A', to the super-heater B. Oil is there sprayed into the gas through the oil nozzle $M^3$ and the water gas carrying the oil with it then passes through the previously heated checker-work in chamber B through conduit B' to the super-heater C, and through the heated checker-work in that chamber to the delivery pipe C'. This pipe is open at the top and provided with a valve or lid D, which is open to permit the products of combustion to escape while the apparatus is being heated up previous to the manufacture of water gas. When the apparatus is ready for manufacturing gas, the lid D, is closed and the water gas then passes from the conduit C' into the conduit E and thence into and through conduit F, F', $F^2$, the lower portion $F^2$ of which passes into the wash box P; from the wash box, the gas is passed through conduit P' to the purifier Q, thence through conduit $Q^2$ to the purifier Q' and thence to the main R.

The oil heating device is situated in the conduit F, F', $F^2$, and consists of a tube G, which is supported in the conduit F by a spider L, upon which rests lugs K, fixed to the pipe G, near its top. This spider also insures that the pipe G, shall occupy a central position in the gas conduit. A socket $G^2$ is welded to pipe G near its top and so near the lugs K, that the expansion and contraction, with the varying temperature, of the distance between them is inconsiderable. To this socket is secured the oil delivery pipe M, which should be substantially at a right angle with the oil heater, and which passes through the opening N, in the gas conduit and is continued as shown at M' $M^2$ leading to the oil injector $M^3$; *m* indicates a valve (not essential) in the pipe M, by which the delivery of oil can be regulated.

With the bottom of the oil heating tube G connects the oil feed pipe O, leading from the oil supply. The bottom of the tube G, is contracted as shown at $G^4$. The feed pipe O, is shown as leading vertically to this contraction as indicated in Figs. 1, and 5, where the pipe O, is shown as leading first vertically downward, then turning at right angles and passing through an opening N' at the side of the wash box. But the main pipe G, may be continued down to the horizontal portion of the feed pipe O. Now, it will be noticed that by the above construction the oil heater is supported at, or so near, the line of the socket $G^2$ that the expansion and contraction of the heater brings no strain upon the outlet pipe M; while the spring of the long horizontal portion of the small pipe O, permits of the full expansion and contraction of the heater without the least injury to any of its parts.

In order to insure greater efficiency in the oil heater I provide an internal rod H, running through the center of the tube G, substantially through its entire length but terminating as shown a short distance above the bottom. The top of this rod H, is preferably welded to the top $G^3$ of the tube G, as indicated in Fig. 2, and lugs or spiders, J, keep it substantially concentric with the tube G. I have referred to this device as a rod, but it is preferably constructed as shown in the form of a tube with both ends closed.

It will be noticed that the head $G^3$ is a solid welded head and that the tube H is welded to this head; by this construction the necessity for joints or plugs is done away with and there is no danger of any leak at this point. The effect of this centrally located rod or tube is, first, to cause the oil to pass upward through the heater in the form of a hollow cylinder, the oil being thus brought into close contact with the heated walls of the tube G; and, secondly, to reduce the volume of oil left in the heater after the end of each run. Any accumulation within the heater tending toward stoppage is removed by an occasional current of steam introduced as at S, and discharged through a waste tap, as at W. It will further be noticed that the form above described allows the heater to be of welded construction throughout and without separable joints except where the inlet and outlet pipes are connected, and it is so built in practice, avoiding entirely the leakage common in devices for this purpose.

Having now described my invention, what I claim as new, and desire to secure by Letters Patent, is—

1. The combination with a gas conduit F of an oil heating tube G situated in said conduit having an oil supply and outlet pipe and formed with its closed head $G^3$ integral with its sides and an internal centrally located rod H secured to head $G^3$ by a welded joint and extending close to its lower end, all substantially as described, so that the hot gas and oil vapor may not intermingle nor escape.

2. In combination with a gas conduit F of an oil heating tube G situated in said conduit having an oil supply and outlet pipe and formed with its closed head $G^3$ integral with its sides, and with a contracted opening in its lower end $G^4$ and an internal centrally located rod H secured to head $G^3$ by a welded joint and extending close to its lower end, all substantially as described, so that the hot gas and oil vapor may not intermingle nor escape.

3. In combination with a gas conduit F of an oil heating tube G situated in said conduit having an oil supply and outlet pipe and formed with its head $G^3$ integral with its sides, an internal centrally located rod H secured to head $G^3$ by a welded joint and extending close to its lower end and spacing lugs J secured to rod H, all substantially as described, so that the hot gas and oil vapor may not intermingle nor escape.

4. The combination with a gas conduit F of an oil heating tube G located in said conduit; an oil delivery pipe M, extending through the walls of conduit F and secured to tube G; an oil entrance pipe O, a springy transversely extending portion of which is secured to tube G; a steam inlet as S into the delivery pipe M, and a waste tap as W, leading from the oil entrance pipe O, all substantially as specified.

5. The combination with a gas conduit F of an oil heating tube supported at or near its upper end in said conduit, an oil delivery pipe M extending through the walls of conduit F and secured to the oil heating tube near its point of support in the conduit F and an oil entrance tube O entering the tube G from below the conduit F and having a transverse extension lying below said conduit to permit of springing.

6. The combination with a gas conduit F having a spider L of an oil heating tube G located in said conduit and supported near its upper end on said spider, an oil delivery pipe M extending through the walls of conduit F, and secured to tube G near the spider and an oil entrance tube O entering tube G from below conduit F and having a transverse extension lying below said conduit to permit of springing.

7. The combination with a gas conduit F and a wash box into which said conduit extends, of an oil heating tube G supported in said conduit, an oil delivery pipe M secured to the tube G near its upper end and an oil entrance pipe O opening into the lower part of the tube G and having a transverse extention in the wash box below conduit F in the wash box substantially as described.

ARTHUR GRAHAM GLASGOW.

Witnesses:
WM. SKEATE,
J. L. FEATHERSTONE.